United States Patent [19]

Thalheim

[11] 4,274,230

[45] Jun. 23, 1981

[54] APPARATUS FOR CONTROLLING A MACHINE TOOL DURING THE MACHINING OF A FIRST WORKPIECE TO BE MATCHED WITH A SECOND WORKPIECE ALREADY MACHINED

[75] Inventor: Gerhard Thalheim, Köniz, Switzerland

[73] Assignee: Sidco, SA, Geneva, Switzerland

[21] Appl. No.: 54,223

[22] Filed: Jul. 2, 1979

[30] Foreign Application Priority Data

Jul. 6, 1978 [CH] Switzerland ........................ 7352/78

[51] Int. Cl.³ .............................................. B24B 49/04
[52] U.S. Cl. ................................ 51/165 R; 51/165.91; 51/165.93
[58] Field of Search ........... 51/105 R, 165.77, 165.83, 51/165.91, 165.93, 165 R

[56] References Cited

U.S. PATENT DOCUMENTS

| | | | |
|---|---|---|---|
| 3,019,565 | 2/1962 | Hatstat | 51/165.91 |
| 3,097,454 | 7/1963 | Pheil | 51/105 R |
| 4,177,607 | 12/1979 | Toda | 51/165.71 |

FOREIGN PATENT DOCUMENTS 1652193 10/1972 Fed. Rep. of Germany.

*Primary Examiner*—Harold D. Whitehead
*Attorney, Agent, or Firm*—Stevens, Davis, Miller & Mosher

[57] ABSTRACT

The invention relates to an apparatus for controlling a machine tool during the machining of a first workpiece to be matched with a second workpiece already machined. The purpose of the invention is that of solving the problem to obtain the desired play along the entire matching section. For grinding a shaft to be matched with a bore, the apparatus comprises two pairs of measuring heads which check corresponding diameters of the shaft and of the bore, near their ends, a control unit for correcting the shape error of the shaft, preferably after a spark-out phase and before finish-grinding, and a control unit which controls the finish phase for obtaining the desired play.

11 Claims, 3 Drawing Figures

APPARATUS FOR CONTROLLING A MACHINE TOOL DURING THE MACHINING OF A FIRST WORKPIECE TO BE MATCHED WITH A SECOND WORKPIECE ALREADY MACHINED

DESCRIPTION

The present invention relates to an apparatus for controlling a machine tool during the machining of a first workpiece to be matched with a second workpiece already machined, with first and second measuring means adapted to check, respectively, the dimensions of the two workpieces on the parts to be matched, and control means for controlling the machine tool depending on the signals of the first and second measuring means. Conventional apparatuses are known in which the diameter of the bore of a female workpiece already machined is checked on a bench by a first measuring device and a grinding machine machining the external surface of a shaft to be matched with the bore is controlled depending on the comparison of the signal provided by the first measuring device with the signal provided by a second measuring device, which checks the diameter of the shaft during machining.

These known apparatuses, which are utilized when the matching tolerances are very small, permit one to avoid making the selection of the workpieces according to different matching classes.

Apparatuses are also known for controlling grinding machines machining tapered or cylindrical workpieces having a considerable length. These known apparatuses comprise two measuring devices checking two relevant diameters of the workpiece and depending on the comparison of the two measurements displacements of the grinding wheel axis or of the workpiece axis are controlled for correcting possible deviations from the nominal taper or from the cylindricity.

The technical problem faced by the present invention is that of realizing an apparatus for controlling a machine tool machining a workpiece to be matched with another workpiece, already machined, which permits one to obtain, through the machining of the first workpiece, a couple of workpieces which can be matched with a high accuracy even if the matching parts are considerably long.

This problem is solved by an apparatus of the type in which, according to the invention, a first measuring means is adapted to check two dimensions on distinct sections of the first workpiece and a second measuring means is adapted to check at least one dimension of the second workpiece, the control means being adapted to process the signals of the first and second measuring means for controlling and regulating the machine tool for obtaining a pre-set matching and for correcting the deviations of the first workpiece from a determined shape.

The invention shall be described in detail with reference to the attached drawings, wherein equal or equivalent parts are marked with the same reference numbers and given as a non-limiting example, in which.

Figure 1:
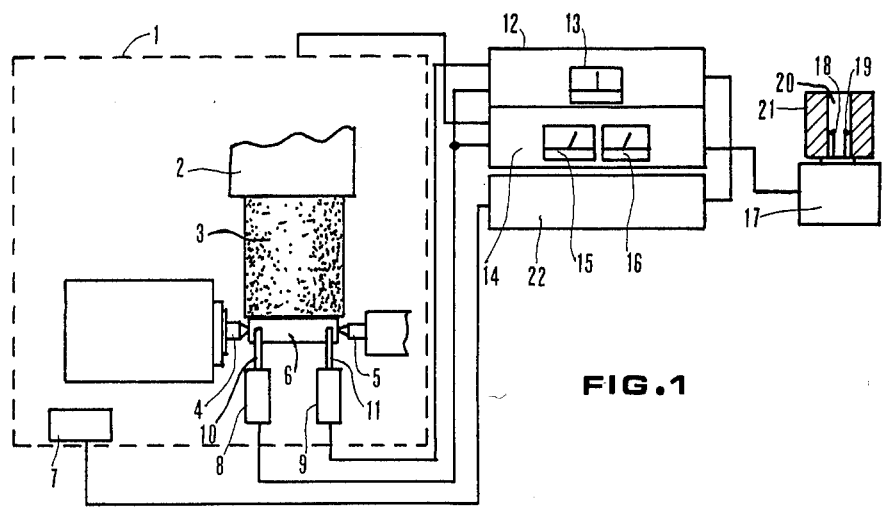
FIG. 1 is a diagram, partially in block form, of an apparatus according to a first embodiment of the invention, for in-process controlling, during the machining on a grinding machine, the cylindricity of a shaft and its matching play with a bore previously machined.

With reference to FIG. 1, an external cylindrical grinding machine 1 comprises a slide 2 carrying a grinding wheel 3, an headstock 4 and a tailstock 5, which axially support a workpiece, namely a shaft 6. Moreover the grinding machine 1 comprises a control device 7, for adjusting the angular position between the grinding wheel 3 axis and the axis passing through the headstock 4 and the tailstock 5 (normally these axes are parallel).

Two measuring heads 8, 9, each having two moving arms 10, 11 with relevant feelers or contacts (only one arm of each head can be seen in the Figure), continuously measure during the machining operation relevant diameters at the ends of shaft 6. More exactly, heads 8, 9 are constituted by electronic gauges and measure the deviations $\Delta D$ of the diameters from the nominal values of the diameters.

Heads 8, 9 are electrically connected with a control unit 12 provided with an indicating instrument 13. A second control unit 14, provided with two indicating instruments 15, 16, is electrically connected with head 8, with the control circuitry of the grinding machine 1 and with a measuring device 17.

Measuring device 17 comprises two moving arms with relevant feelers 18, 19 and checks the diameter of a bore 20 of a workpiece 21 with which shaft 6 must be matched. Unit 12 is connected with a regulating unit 22, which in turn is connected with control device 7. Some other features of the apparatus of FIG. 1 and the operation of the latter are now described with further reference to FIG. 2.

An amplifier 23 comprised in unit 14 has an inverting input connected with head 8 and a non-inverting input connected with measuring device 17. The output signal of amplifier 23, which is proportional to $\Delta Dc - \Delta Da$ (where $\Delta Da$ and $\Delta Dc$ are the deviations, detected by head 8 and measuring device 17, between the actual diameters and their relevant nominal values), reaches the relevant inputs of four comparators 24, 25, 26, 27 contained in unit 14. Comparators 24, 25, 26, 27 receive on other inputs reference signals provided by potentiometers 28, 29, 30, 31. The two comparators 25, 26 control the starting of the initial phases of the machining operations.

When the output signal of amplifier 23 reaches, during the grinding of shaft 6, the reference value provided by potentiometer 28, comparator 24 switches over, enabling a control unit 32 to control the start of a spark-out phase. Control unit 32, which is also contained in unit 14, is connected to the electrical control circuits 33 of grinding machine 1. A comparator 34, contained in unit 12, has a non-inverting input connected with head 8, an inverting input connected with head 9 and an enabling terminal connected with the electrical circuits 33 of the grinding machine.

After completion of the spark-out phase, which permits the recovery of the strains and deformations accumulated during the preceding phases of machining, comparator 34, actuated by circuits 33 provides at its output a signal proportional to $\Delta Da - \Delta Db$ (where $\Delta Db$ is the deviation detected by head 9). This signal, amplified and converted in a suitable form by regulating unit 22, operates control device 7, which regulates the mutual angular position of the grinding wheel axis and of the axis passing through headstock 4 and tailstock 5 in such a way as to compensate, during the machining, the cylindricity error $\Delta Da - \Delta Db$.

The machining operation continues with a subsequent phase of feed of grinding wheel slide 2. The end of this phase is controlled through the signal $\Delta Dc - \Delta Da$ by comparator 27. The machining of shaft 6 is terminated, by a stop control provided by comparator 27, as soon as the difference $\Delta Dc - \Delta Da$ reaches the value corresponding to the desired matching play. It is then possible to check, by instrument 13 of unit 12, whether the possible residual deviation from cylindricity $\Delta Da - \Delta Db$ is comprised between the limits of the relevant tolerance field.

Instruments 13, 15, 16 may be changed over the different circuits of units 12, 14 for selectively permitting the indication of deviations $\Delta Da$, $\Delta Db$, $\Delta Dc$, of the instantaneous and final values of the deviation $\Delta Dc - \Delta Da$ between the actual play and the desired play and of the cylindricity error $\Delta Da - \Delta Db$.

Since the nominal matching play has a pre-set value, it is evident that the indication of the signal $\Delta Dc - \Delta Da$ is equivalent to that of the actual play value, which may be equally obtained summing to the proportional signal $\Delta Dc - \Delta Da$ a reference corresponding to the nominal play value.

Similar remarks may be made for the diameters.

For these reasons in the description and in the claims reference is often made to the checking and indication of diameters and play even if, as a matter of fact, the quantities really checked or visualized are usually deviations from the relevant nominal values.

Figure 2:
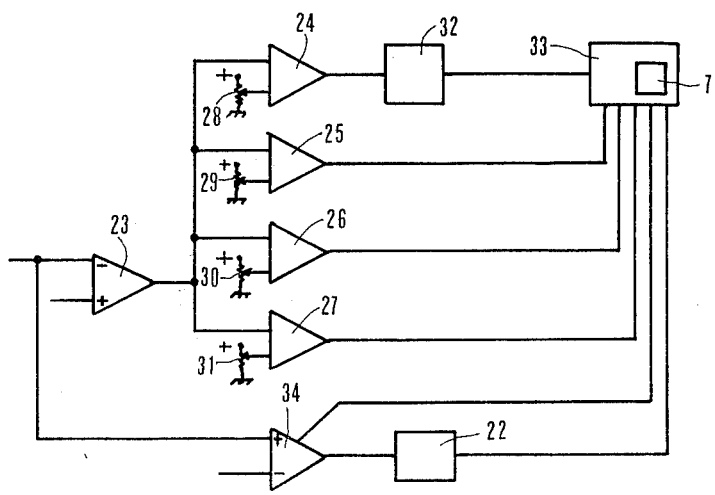
FIG. 2 is a block diagram of the main electrical circuits of the apparatus of FIG. 1.

The apparatus of FIGS. 1 and 2 permits one to obtain a machining cycle of the shaft 6 to be matched to bore 20 (supposed perfectly cylindrical and with cross-sections perfectly round) leading to the obtainment of a shaft with negligible cylindricity errors and with a difference of diameter between the shaft and the bore corresponding to the desired play value.

Figure 3:
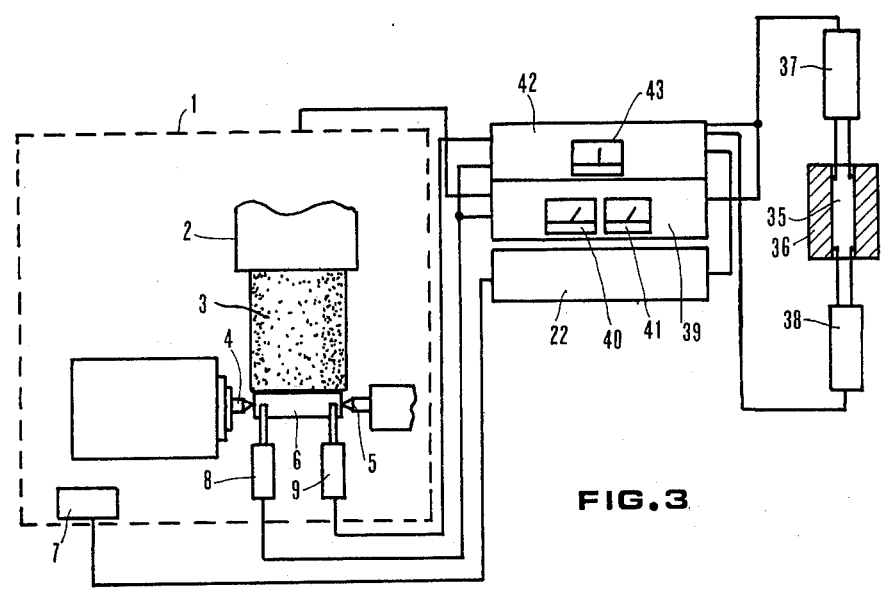
FIG. 3 is a diagram, partially in block form, of an apparatus according to the preferred embodiment of the invention, for controlling the cylindricity of a shaft during its machining in a grinding machine and for controlling the matching with a bore previously machined.

The apparatus according to the variant of FIG. 3 is adapted to control a match grinding even if the bore 35 of the workpiece 36 has, intentionally, or because of shape errors, a tapered surface.

Two diameters $D_d$, $D_e$ of the bore 35 (previously machined), in two cross-sections near the bore ends and corresponding to the cross-sections checked by heads 8,9, are checked by a measuring device with two measuring heads 37, 38, each having two moving arms with relevant feelers.

A control unit 39 with two indicating instruments 40, 41 is connected with heads 8, 37.

When the signal $\Delta D_d - \Delta Da$ reaches a determined value preset on a potentiometer of unit 39, unit 39 provides to grinding machine 1 a command for the starting of a spark-out phase. A further control unit 42, connected with heads 8, 9, 37, 38 and having an indicating instrument 43, provides a signal responsive to the value $[\Delta D_e - \Delta Db] - [\Delta D_d - \Delta Da]$ and compares it with a pre-set reference voltage K (normally K is equal to zero).

Unit 42 calculates a correction signal $[\Delta D_e - \Delta Db] - [\Delta D_d - \Delta Da] - K$ and controls through regulating unit 22 the actuation of control device 7. As a consequence of this actuation and of the restarting of wheel slide 2 feed, there is obtained the equality of the play values $\Delta D_e - \Delta Db$ and $\Delta D_d - \Delta Da$ in correspondence with the cross-sections of shaft 6 and bore 35 where diameters are checked by heads 8, 9, 37, 38.

The continuation of the machining operation is subsequently controlled by unit 39 depending on the value of signal $\Delta D_d - \Delta Da$, until obtaining the desired matching play value.

After ending the machining operation it is possible to check by instrument 43 the final values $\Delta D_e - \Delta Db$ and $\Delta D_d - \Delta Da$.

In the apparatus of FIG. 3, too, instruments 40, 41, 43 can be switched over the different circuits of units 39, 42 in order to display, as desired, the deviations $\Delta Da$, $\Delta Db$, $\Delta D_d$, $\Delta D_e$, $\Delta D_d - \Delta Da$, and $\Delta D_e - \Delta Db$ and the play difference $[\Delta D_d - \Delta Da] - [\Delta D_e - \Delta Db]$. Unit 42 can also continuously calculate the play difference, stopping the machining operation in case, not withstanding the correction made, this difference exceeds pre-set value.

By means of the apparatus of FIG. 3 it is therefore possible to obtain a constant matching play for the different corresponding cross-sections of a shaft which is ground and of a bore previously machined, even if the bore has a tapered shape. This means that it is possible to machine the shaft obtaining a shape corresponding to that of the bore and obtaining the desired play value.

The apparatus also is adapted, by making simple modifications, to control the grinding machining of a bore to be matched with a shaft previously ground.

The apparatus may be utilized not only for plunge-cut grinding machines, but also for through-feed or reciprocating grinding machines. It is sufficient, for the latter, to detect the signals of the measuring heads, which check the workpiece being machined, at the end of each passage.

It is evident that the number of measuring heads or of suitable measuring devices may be different from that exemplified. For example, it is possible to realize an apparatus equivalent to that of FIG. 3 by employing a single head for checking the bore: it is sufficient to displace the head or the workpiece in such a way as to check diameters $D_d$ and $D^e$.

The measurements made by the measuring heads and the relevant control circuits also can comprise the detection and the subsequent processing of the maximum and/or minimum deviations of the diameters from the relevant nominal values. In this case it is evidently necessary to impart a relative rotary movement between the heads checking the workpiece on the bench and the workpiece itself.

In the described apparatuses, the correction of the cylindricity error (or of the variations of play values) is preferably carried out before the finish grinding phase of the machine. It was found that a good correction can be obtained by an open-loop system including a digital control device 7, for example with a stepping motor.

Regulating unit 22 may advantageously be of a type known per se providing to stepping motor commands for carrying out one or more revolution steps, after the error signal surpasses one or more threshold.

It was found that by controlling the regulation, for correcting the cylindricity error or the variation of the play value, after a spark-out phase and before the finish grinding of the workpiece the desired shape is obtained, after the machining operation, with good accuracy.

The invention may also be applied for the machining of surfaces different from surfaces of rotation, for example for obtaining the width matching between a spline and its key and for correcting during the machining operation the shape of the spline or of the key.

What is claimed is:

1. Apparatus for controlling a machine tool during the machining of a part of a first workpiece to be matched with a part already machined of a second workpiece, comprising:

first measuring means adapted to cooperate with said part of the first workpiece for providing a first signal and a second signal for checking respectively two dimensions on two distinct sections of said part of the first workpiece;

second measuring means adapted to cooperate with said part already machined for providing a third signal for checking a dimension of the part already machined; and processing and control means coupled to the first and second measuring means to receive said first, second and third signal, the processing and control means being adapted to process the first and second signal for controlling and regulating the machine tool for correcting the deviations of the part of the first workpiece from a determined shape and to process the first and the third signal for controlling the machine tool for obtaining a pre-set matching between said parts.

2. The apparatus according to claim 1, wherein said parts have circular cross-sections, said first and second measuring means are adapted to check diameters of cross-sections of the parts and said processing and control means are adapted to correct the deviations from cylindricity or taper of the part of the first workpiece.

3. The apparatus according to claim 2, wherein said second measuring means are adapted to provide a fourth signal, the third and the fourth signal being responsive to the diameters of the part of the second workpiece on two cross-sections corresponding to said distinct sections of the part of the first workpiece, the processing and control means receiving said fourth signal.

4. The apparatus according to claim 3, wherein said machine tool is a grinding machine and said processing and control means comprise processing circuits for comparing said first signal with said third signal, for providing an enabling signal upon the obtainment of a pre-set matching play, the processing circuits being moreover adapted to calculate a signal responsive to the difference between actual values of play between the parts of the workpieces in correspondence with said cross-sections, the processing circuits being further adapted to control, upon the obtainment of said enabling signal, a regulation of the grinding machine for compensating, during the proceeding of the machining, the difference between said actual values of play, and to control the machining stop depending on a comparison of the first and third signal, for obtaining the desired matching play.

5. The apparatus according to claim 4, wherein said processing circuits are adapted to control, upon the obtainment of said enabling signal and before the controlling of said regulation, the starting of a spark-out phase.

6. The apparatus according to claim 4 or claim 5, wherein the first workpiece is a shaft and said part already machined defines a bore, said first measuring means comprising two measuring heads adapted to check the relevant diameters at the ends of the shaft and said second measuring means comprising two measuring heads adapted to check the relevant diameters of the bore.

7. The apparatus according to claim 2, wherein said machine tool is a grinding machine and said processing and control means comprise processing circuits adapted to compare the difference between said first signal and said third signal with a reference value, for controlling subsequently the regulation of the grinding machine for correcting the deviations from cylindricity of the part of the first workpiece depending on the comparison of the first and second signal, the processing circuits being moreover adapted to control the machining stop upon the obtainment of the desired matching play depending on a comparison of the first and third signal.

8. The apparatus according to claim 4 or claim 7, wherein said processing and control means comprise an open-loop circuit for controlling said regulation of the grinding machine.

9. The apparatus according to claim 4, wherein said first and second measuring means comprise indicating devices for indicating the values of the play between the parts of the two workpieces in correspondence with said cross-sections and for indicating the difference between said play values.

10. The apparatus according to claim 7, wherein said first and second measuring means comprise indicating devices for indicating the value of play between the parts of the first and the second workpiece and the deviation from cylindricity of the part of the first workpiece.

11. The apparatus according to claim 2, wherein said first and second measuring means are adapted to measure the maximum and minimum deviations, from the nominal values, of the diameters of said cross-sections of the part of the first workpiece and of at least a cross-section of the part of the second workpiece, the processing and control means being adapted to process said deviations for controlling and regulating the machine tool.

* * * * *